April 20, 1926.  
F. R. L. STOTT ET AL  
1,581,301  
EMERGENCY BUMPER FOR VEHICLES  
Filed August 16, 1924  4 Sheets-Sheet 1
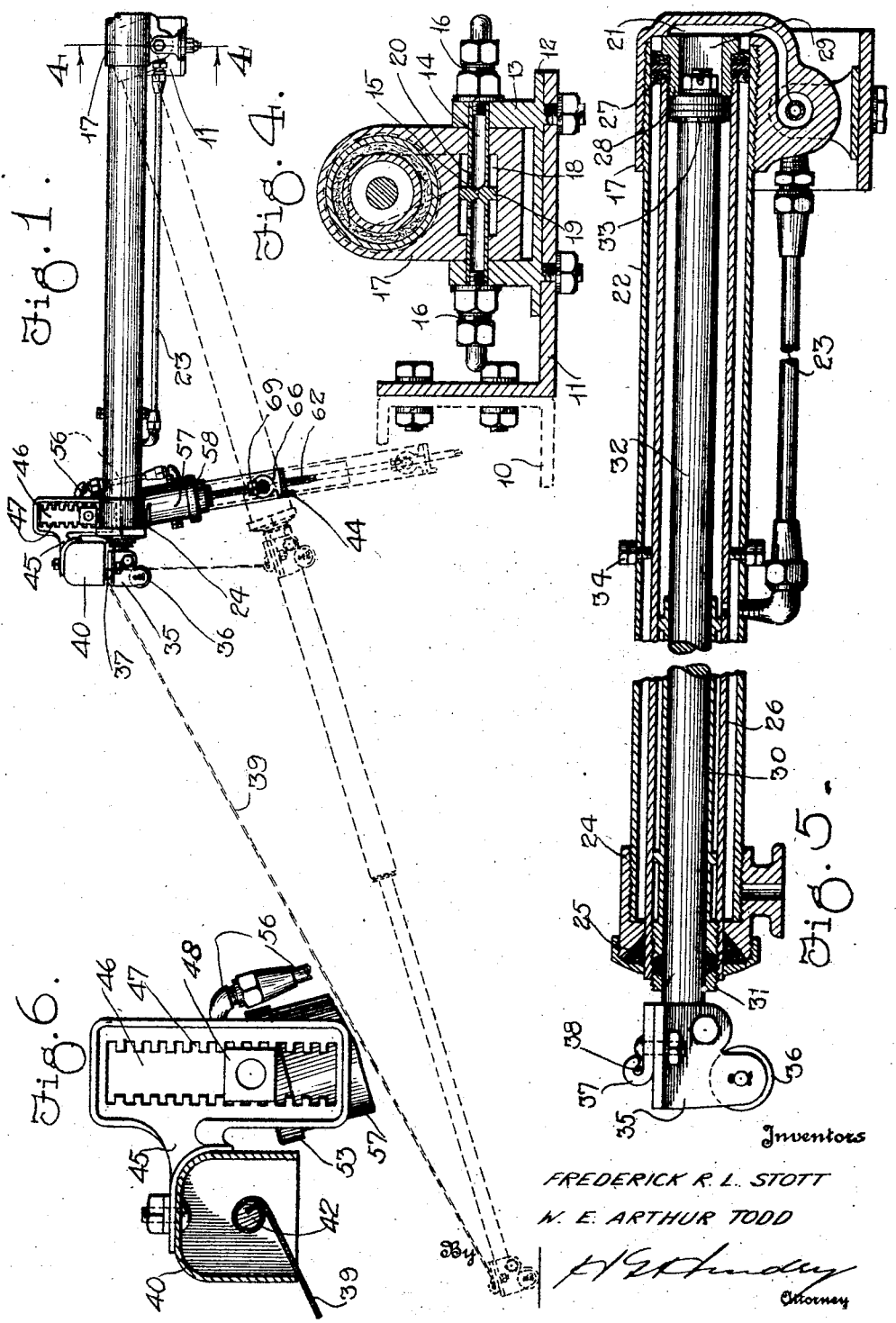
Inventors  
FREDERICK R. L. STOTT  
N. E. ARTHUR TODD  
By  
Attorney April 20, 1926.
F. R. L. STOTT ET AL
1,581,301
EMERGENCY BUMPER FOR VEHICLES
Filed August 16, 1924     4 Sheets-Sheet 2
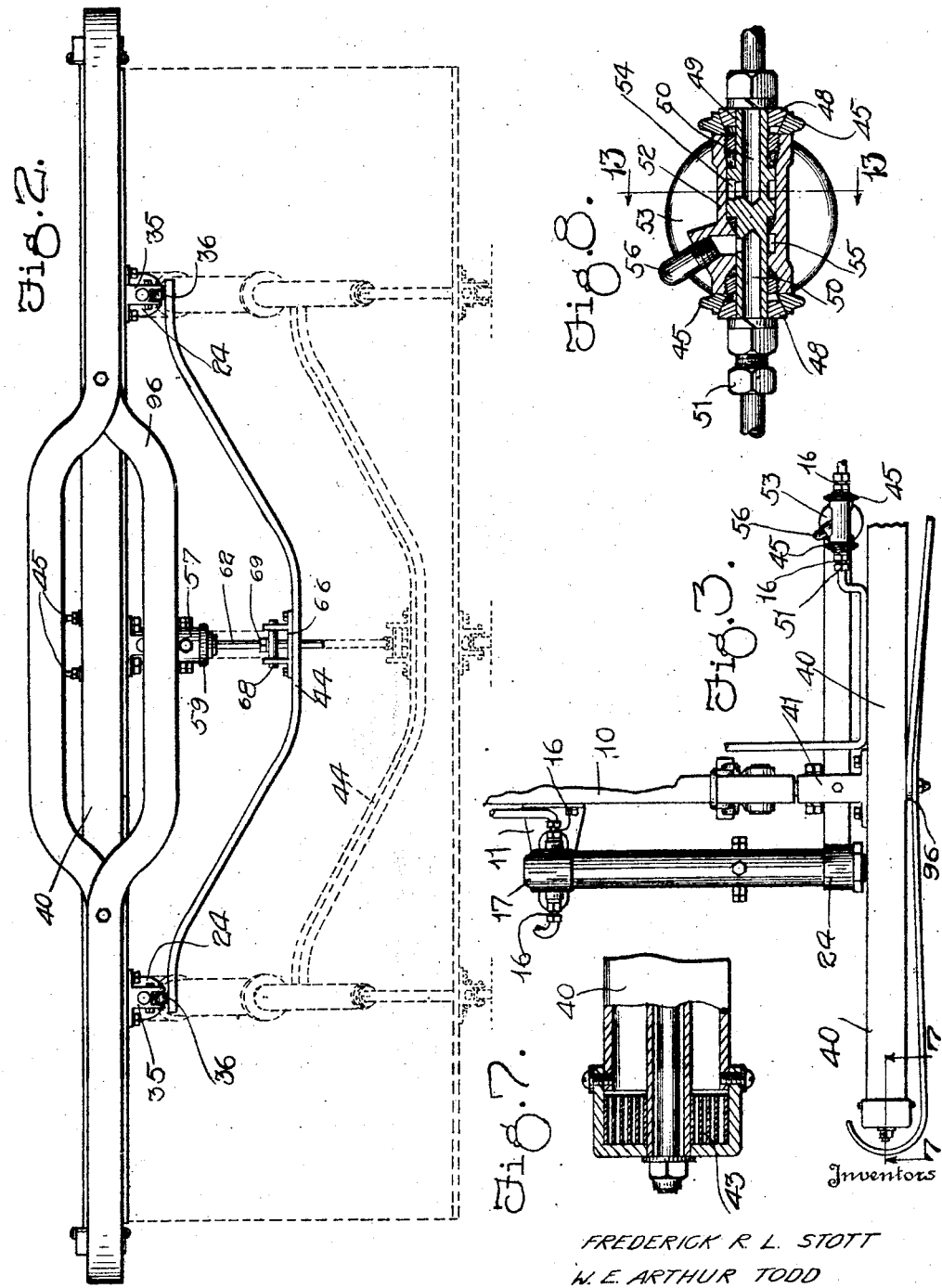
FREDERICK R. L. STOTT
W. E. ARTHUR TODD

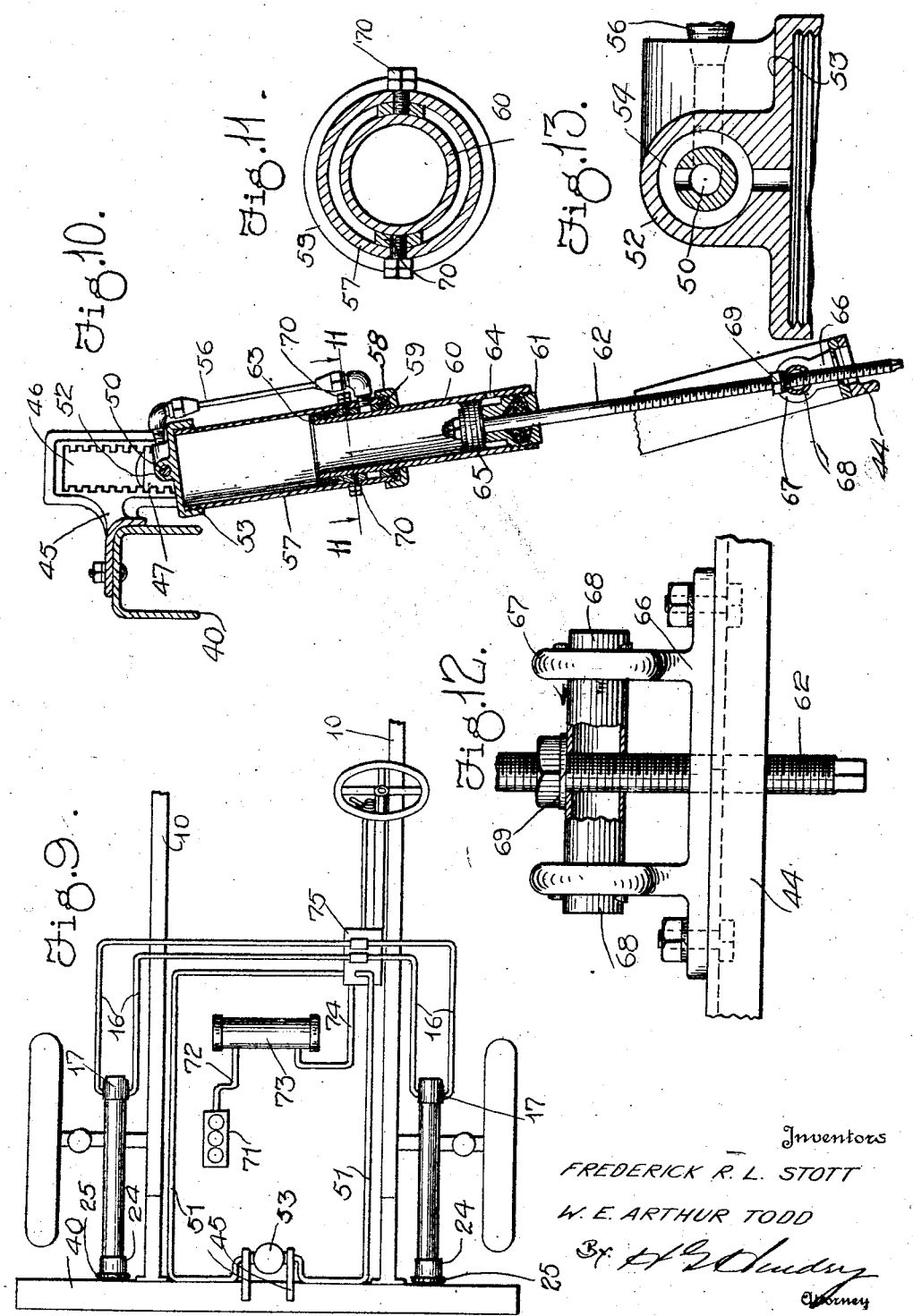

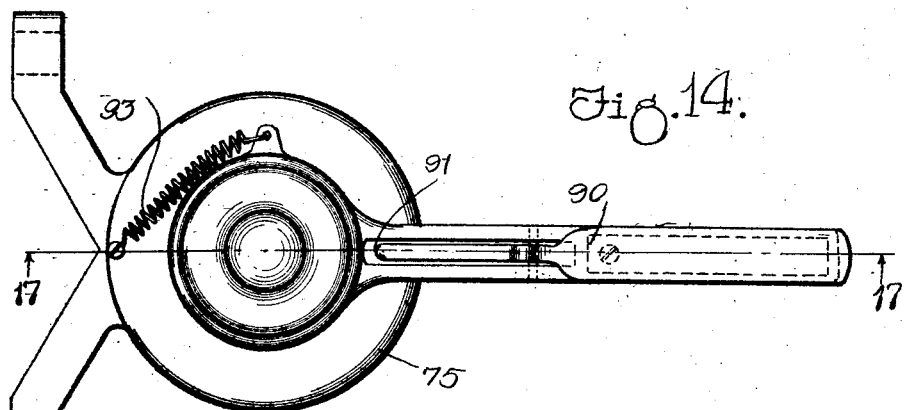
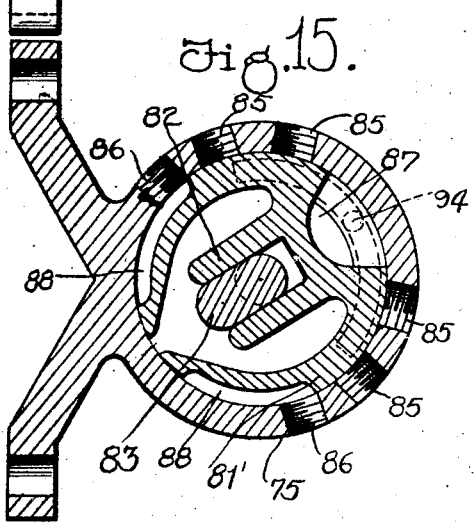
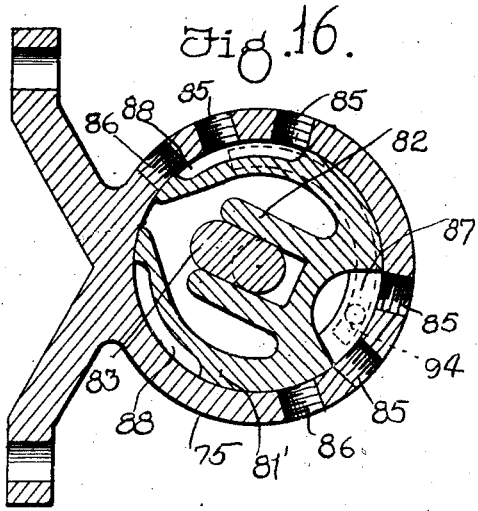
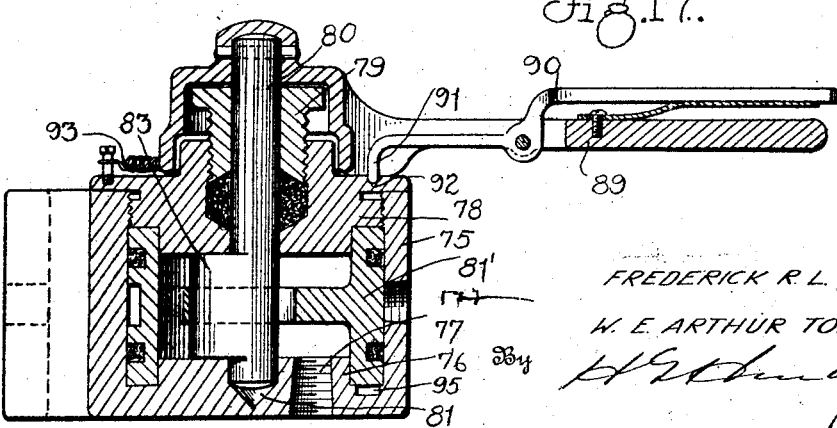

Patented Apr. 20, 1926.

1,581,301

UNITED STATES PATENT OFFICE.

FREDERICK R. L. STOTT AND WILLIAM E. ARTHUR TODD, OF HAMILTON, ONTARIO, CANADA, ASSIGNORS OF FORTY ONE-HUNDREDTHS TO OSCAR W. HAIST, OF HAMILTON, CANADA, FORTY ONE-HUNDREDTHS TO SAID STOTT, AND TWENTY ONE-HUNDREDTHS TO SAID TODD.

EMERGENCY BUMPER FOR VEHICLES.

Application filed August 16, 1924. Serial No. 732,463.

*To all whom it may concern:*

Be it known that FREDERICK R. L. STOTT and WILLIAM E. ARTHUR TODD, both subjects of the King of Great Britain, and residing at Hamilton, in the county of Wentworth and Province of Ontario, Canada, have invented certain new and useful Improvements in Emergency Bumpers for Vehicles, of which the following is a specification.

This invention relates to automobiles and has special reference to a fender for automobiles and other vehicles designed to protect persons from being run over by such vehicles.

Owing to the various conditions arising in the operation of automobiles it is not practicable to provide such vehicles with a permanently positioned fender. For instance, such a fender would interfere seriously with the ordinary parking of such a vehicle.

One important object of the present invention is, therefore, to provide an improved and novel form of fender which, under ordinary conditions, will be so housed or collasped as not to interfere with any of the ordinary running operations and which, furthermore, will not present an unsightly appearance at the front of the vehicle.

In the driving of an automobile the operator, especially in emergency has use for both of his hands and both of his feet. Consequently any arrangement of housed fender which requires the operator to manipulate a crank, pull on a lever, or perform any other operation which takes any appreciable time, cannot be used in practice.

A second important object of the present invention is to provide an improved fender of this class wherein the operation of moving the fender from housed position to position of use will be effected by means of merely touching a lever or button on the part of the operator, the means effecting with great rapidity the succeeding operations.

A third important object of the invention is to provide a device of this description which can, at the will of the operator, be protracted and retracted by compressed air, the whole being of novel and improved character.

A fourth important object of the invention is to provide an improved pivot and air supply means for devices of this character.

A fifth important object of the invention is to provide an improved form of control valve.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of the improved fender removed from the vehicle, the device being shown in retracted position in full line and in protracted position in dotted lines.

Figure 2 is a corresponding front elevation thereof.

Figure 3 shows one side of the device in plan, the remaining side being symmetrical with respect thereto.

Figure 4 is an enlarged detail section on the line 4—4 of Figure 1.

Figure 5 is a vertical longitudinal section through one of the side cylinders of the device.

Figure 6 is an enlarged detail view, partly in section, showing the support for the upper part of the vehicle or center cylinder.

Figure 7 is a detail view, partly in section, of one end of the apron housing.

Figure 8 is an enlarged detail section through the central pivot and air distributing valve.

Figure 9 is a diagrammatical view of the device as applied to the front of a vehicle and showing the piping arrangement.

Figure 10 is a vertical median section through the center of the vertical cylinder of the device.

Figure 11 is a section on the line 11—11 of Figure 10.

Figure 12 is an enlarged detail front view of the stirrup and the bottom of the vertical cylinder.

Figure 13 is an enlarged detail section on the line 13—13 of Figure 8.

Figure 14 is a top plan view of a special form of control valve particularly adapted for use in this connection.

Figure 15 is a section on the line 15—15 of Figure 14.

Figure 16 is section on the line 16—16 of Figure 15, showing the moving part of the valve in one position.

Figure 17 is a view similar to Figure 16 but showing the moving part of the valve in a second position.

Briefly describing the device, the essential parts are an apron supported like a window shade on a spring roller, a bar on the free edge of said apron, a pair of compressed air cylinders connected to the bar for shoving the free edge of the apron forward, a vertical cylinder for projecting said free edge downward, a valve controlling the operation of said cylinders and pipe connections leading from the valve to the cylinders. As auxiliary parts there are preferably used a small air compressor driven from the engine of the vehicle and a storage tank from which the valve receives its air supply. These parts will now be described in detail. The side frame members of the vehicle are shown at 10 Figure 3 and projecting from each of these side frame members is a bracket 11 whereon is mounted a bearing plate 12 Figure 4 having at each side an upstanding bearing 13. Through the bearings 13 passes a hollow shaft or pin 14, the two ends of which are so bored as to leave a septum 15 in the middle. Screwed into each end of the shaft 14 is a pipe connection 16 for purposes presently to be understood. Pivotaly mounted on the shaft 14 is a rear cylinder head 17 having a chamber 18 surrounding the pin 14 and the ends of this chamber are separated from each other by a shoulder 19 which may either be formed centrally of the pin or integrally with the cylinder head 17. The hollow ends of the pin 14 communicate with the respective ends of the chamber 18 through ports 20. One of these ports 20 communicates through its end of the chamber 18 with a passage 21 opening into the rear end of an outer cylinder 22, this rear end being fixed in the cylinder head 17. The other port 20 communicates through its end of the chamber 18 with a pipe 23 which extends beneath the cylinder 22 and opens into said cylinder adjacent its front or free end. At the front end of the cylinder 22 is a front cylinder head 24 provided with a stuffing box 25 wherethrough extends an inner cylinder 26 having on its rear end a packed piston 27 which, in turn, carries a cylinder head 28 having a centrally disposed opening 29. At the front end of the cylinder 26 is a front cylinder head and guide 30 provided with a suitable stuffing box 31 through which passes a piston rod 32 carrying on its rear end a piston 33. Guide pins 34 may be used to guide the central portions of the long inner cylinder 26. Each of the piston rods 32 carries on its projecting end a head 35 on which is supported a ground wheel or roller 36. Secured to each head 35 is a bracket 37 and these brackets grip a rod 38 to which is attached the front edge of an apron 39 made of any suitable material such as woven wire, canvas, or the like.

Extending across the front of the automobile is a housing 40 which is connected to the frame members 10 by brackets 41. Within this housing is a roller 42 which is normally wound in one direction by a spring 43, as seen in Figure 7. The rear edge of the apron 39 is secured to this roller and with the device in inoperative position the heads 35 lie, as shown in Figure 1, immediately below the housing so that the apron is practically all rolled up in the housing.

It will now be plain that by admitting air through one of the pipe connections 16 it will pass through the passage 21 and, if at the same time, air is allowed to escape through the other pipe connection, the telescopic cylinders 26 and the piston rods 32 will be projected forwardly thus carrying the free edge of the apron forward and unrolling the same.

The under side of the cylinder heads 24 are connected by a stirrup member 44, the central portion of which is depressed, as can be seen in Figure 2. Carried centrally by the housing 40 is a pair of brackets 45 which project rearwardly of the housing 40 and are formed with vertical slots 46 Figure 6 having crenellated sides 47. Fitting in these crenellated sides are bearing members 48 which are toothed to engage the crenellations so that they can be vertically adjusted. These bearing members support a pivot pin 49 similar to the pin 14. That is to say a bore 50 Figure 10 is provided in each end of the pivot pin and pipe connections 51 are attached to the ends of said pin in communication with the bores. This pin forms a journal for a bearing sleeve 52 which is formed on the upper end of an air cylinder 53 and has at one end a chamber 54 which communicates with the interior of the head 53, and at its other end a chamber 55 which is connected by a pipe 56 with the lower end of a cylinder 57 Figure 10 attached to the head 53 to depend therefrom. This cylinder has a head 58 on its lower end provided with a suitable stuffing box 59 through which extends an inner cylinder 60 Figure 8 open at its top end and having a stuffing box 61 at its lower end through which passes a piston rod 62. The cylinder 60 has at its upper end a piston 63 above the opening with which the pipe 56 comunicates. Also the cylinder 60 has a lateral opening 64 below the head 65 carried by the piston rod 62. On the stirrup 44 is mounted a bracket 66 having spaced bearings 67 supporting a pin 68 which thus swivels the said bearings. Through the pin 68 is screwed the lower end of the piston rod 62, suitable lock nuts 69 being employed to prevent unscrewing when adjusted. By this means positions of the stirrup 44 relative to the pin 50 may be suitably varied.

It is also to be remembered that in each case that when air is admitted to one end of a cylinder the other end is open to the atmosphere. In the present device, when air is admitted to the top end of the two cylinders, the inner cylinder and piston rod are shoved downwardly carrying the heads 24 with them which, of course, moves the front edge of the apron downward. When air is admitted below the head 64 through the pipe 56 the inner cylinder is first pushed upward until the opening 64 registers oppositely the inlet of the pipe 56 whereon the piston 65 will also be pushed upwardly. Suitable guide pins 70 are provided for the inner cylinder 60 as can be seen best in Figure 11. Referring now to Figure 9, there is indicated a small air compressor 71 which is connected by a pipe 72 with a storage tank 73, the latter being in turn connected by a pipe 74 with a valve body or casing 75, this valve being presently described in detail. The pipe connections 51 and 16 also lead to this valve body.

The valve casing 75 is located convenient to the operator and forms a hollow cylindrical body having a bottom 76. This bottom has a threaded opening 77 for the reception of the pipe from a storage reservoir. Screwed into the upper end of the casing 75 is a bonnet 78 provided with a packing gland 79 wherethrough passes a valve stem 80 fitted at its lower end in a socket 81, formed in the bottom. The bonnet 78 and the bottom 76 are provided with annular channel portions to receive the edges of a hollow cylindrical valve 81' having an inwardly projecting socket 82 which embraces the valve stem 80, the latter being provided with a lug 83 fitting between the arms of the socket 82 so as to turn the valve as the valve stem is rotated. The opening 77 communicates with the interior of the cylindrical valve. The wall of the casing 75 is provided in two places with three openings, two of which are threaded as at 85 while the other is a plain opening 86. These plain openings are simply exhaust openings while to the threaded openings are attached the pipes from the various cylinders, the pipes for protraction from the outside cylinders and central cylinder being connected respectively to the opening closest to one exhaust port and the second opening nearest the same exhaust port while, similarly the retraction pipes are connected to the other set. Formed in the valve and communicating with the space into which the opening 77 leads is a port 87. Also ports 88 are provided at each side of the opening 84. These ports 88 are sufficiently long to bridge all three sets of the openings 85 and 86 when registered therewith while the port 87 is only intended to bridge two of the openings 85 when moved to register therewith. Carried by the upper end of the valve stem 80 is a handle or lever 89 on which is a spring pressed lever 90 having a finger 91 normally held in a suitable recess 92 so that the valve is held from turning. Suitable spring means, such as are shown at 93, is used to turn the valve from its neutral position to projecting position whenever the operator taps down on the lever 90 to free the valve lever 89. Thus the operator does not have to actually move the valve to open position. The neutral position is shown in Figure 15. With the valve in the position shown in Figure 15, if the finger 91 be released the valve moves around so that the lower port 88 projects the lower set of openings 85 and 86. This shows the lower ends of the cylinder in communication with the atmosphere. At the same time air under pressure is first admitted to the central cylinder through the first of the ports 85, passing for this purpose through the port 87. This shoves the stirrup downward and immediately thereafter the second port is brought into communication with air under pressure and the edge of the apron projected forward. In raising the device the reverse operation takes place, the valve being moved to the position shown in Figure 16. In the under side of the valve 78 is a pin 94 which moves in a groove 95 formed in the bottom 76. This pin acts as a stop to limit movement of the valve 81. In order to prevent injury to the housing a spring bumper 96 is preferably mounted thereon.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a vehicle fender, an apron, a roller on which said apron is normally wound, means to move the free edge of said apron downwardly and upwardly, and other means to move said free edge forwardly and rearwardly.

2. In a vehicle fender, an apron, a roller upon which said apron is normally wound, pneumatic cylinders pivoted at their rear ends to swing in vertical arcs, and provided with pistons and rods, said rods being connected to the free edge of the apron, and pneumatic means for raising and lowering the front ends of said cylinders.

3. In a vehicle fender, an apron, a roller upon which said apron is normally wound, pneumatic cylinders pivoted at their rear ends to swing in vertical arcs, and provided with pistons and rods, said rods being connected to the free edge of the apron, a stirrup connecting the ends of said rods, and a substantially vertical pneumatic cylinder having a piston and a piston rod connected to said stirrup to raise and lower the same.

4. In a vehicle fender, an apron, a roller on which said apron is normally wound, means to move the free edge of said apron downwardly and upwardly, other means to move said free edge forwardly and rearwardly, and spring means for rewinding the apron on said roller when unwound therefrom.

5. In a vehicle fender, an apron, a roller upon which said apron is normally wound, pneumatic cylinders pivoted at their rear ends to swing in vertical arcs, and provided with pistons and rods, said rods being connected to the free edge of the apron, pneumatic means for raising and lowering the front ends of said cylinders, and spring means for rewinding the apron on said roller when unwound therefrom.

6. In a vehicle fender, an apron, a roller upon which said apron is normally wound, pneumatic cylinders pivoted at their rear ends to swing in vertical arcs and provided with pistons and rods, said rods being connected to the free edge of the apron, a stirrup connecting the ends of said rods, a substantially vertical pneumatic cylinder having a piston and a piston rod connected to said stirrup to raise and lower the same, and spring means for rewinding the apron on said roller when unwound therefrom.

7. In a vehicle fender, an apron, a roller upon which said apron is normally wound, pneumatic cylinders pivoted at their rear ends to swing in vertical arcs, provided with pistons and rods, said rods being connected to the free edge of the apron, pneumatic means for raising and lowering the front ends of said cylinders, and a single multiple port valve for controlling the pneumatic devices.

8. In a vehicle fender, an apron, a roller upon which said apron is normally wound, pneumatic cylinders pivoted at their rear ends to swing in vertical arcs, and provided with pistons and rods, said rods being connected to the free edge of the apron, a stirrup connecting the ends of said rods, a substantially vertical pneumatic cylinder having a piston and a piston rod connected to said stirrup to raise and lower the same, and a single multiple port valve for controlling the pneumatic devices.

9. In a vehicle fender, an apron, a roller upon which said apron is normally wound, pneumatic cylinders pivoted at their rear ends to swing in vertical arcs and provided with pistons and rods, said rods being connected to the free edge of the apron, pneumatic means for raising and lowering the front ends of said cylinders, a single multiple port valve for controlling the pneumatic devices, and spring means for rewinding the apron on said roller when unwound therefrom.

10. In a vehicle fender, an apron, a roller upon which said apron is normally wound, pneumatic cylinders pivoted at their rear ends to swing in vertical arcs and provided with pistons and rods, said rods being connected to the free edge of the apron, a stirrup connecting the ends of said rods, a substantially vertical pneumatic cylinder having a piston and a piston rod connected to said stirrup to raise and lower the same, a single multiple port valve for controlling the pneumatic devices, and spring means for rewinding the apron on said roller when unwound therefrom.

11. In a vehicle fender, an apron, a roller upon which said apron is normally wound, pneumatic cylinders pivoted at their rear ends to swing in vertical arcs, provided with pistons and rods, said rods being connected to the free edge of the apron, pneumatic means for raising and lowering the front ends of said cylinders, a single multiple port valve for controlling the pneumatic devices; in combination with an air compressor, and a storage tank fed by said compressor and communicating with said valve.

12. In a vehicle fender, an apron, a roller upon which said apron is normally wound, pneumatic cylinders pivoted at their rear ends to swing in vertical arcs, and provided with pistons and rods, said rods being connected to the free edge of the apron, a stirrup connecting the ends of said rods, a substantially vertical pneumatic cylinder having a piston and a piston rod connected to said stirrup to raise and lower the same, a single multiple port valve for controlling the pneumatic devices; in combination with an air compressor, and a storage tank fed by said compressor and communicating with said valve.

In witness whereof we have affixed our signatures.

FREDERICK R. L. STOTT.
W. E. ARTHUR TODD.